Figure 1:
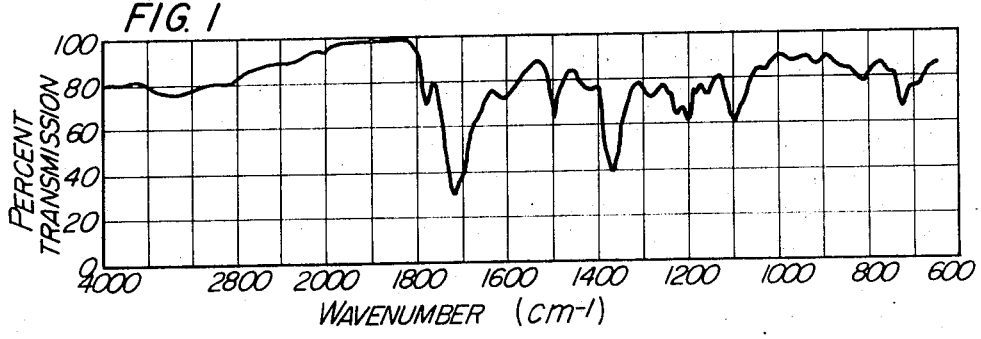

United States Patent
Suzuki et al.

[15] 3,692,740
[45] Sept. 19, 1972

[54] PHNOLIC-SOLVENT-SOLUBLE AROMATIC POLYAMIDE-IMIDE AND PROCESS FOR PRODUCING SAME

[72] Inventors: Munehiko Suzuki, Yokosuka; Etsuo Hosokawa, Yokohama; Misao Waki, Kawasaki; Masatada Fukushima, Yokohama, all of Japan

[73] Assignee: Showa Electric Wire & Cable Co., Ltd., Kawasaki-shi, Japan

[22] Filed: June 18, 1970

[21] Appl. No.: 47,380

[30] Foreign Application Priority Data

June 24, 1969 Japan......................44/49959

[52] U.S. Cl.........260/47 CP, 117/128.4, 117/161 P, 260/33.4 P, 260/65, 260/78 TF
[51] Int. Cl. ...............................................C08g 20/32
[58] Field of Search.................260/47 CP, 65, 78 TF

[56] References Cited

UNITED STATES PATENTS 3,277,043  10/1966  Holub......................260/33.4
3,485,796  12/1969  Naselow....................260/47
3,494,890  2/1970   Morello.....................260/47

FOREIGN PATENTS OR APPLICATIONS 1,075,284  7/1967  Great Britain.........260/47 CP

*Primary Examiner*—William H. Short
*Assistant Examiner*—L. L. Lee
*Attorney*—Craig, Antonelli, Stewart & Hill

[57] ABSTRACT

A novel aromatic polyamide-imide is synthesized by heating and reacting a mixture of trimellitic acid and 3,3', 4,4'-benzophenone tetracarboxylic acid with a diamine represented by the formula:

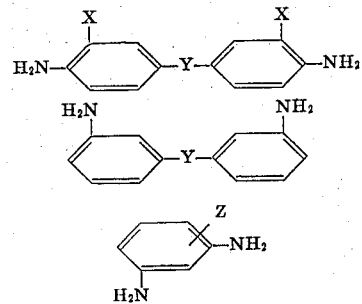

or in substantially equimolar amounts in an organic solvent. Up to 70 mole per cent of said acid component may be replaced by other aromatic tetracarboxylic acids and up to 70 mole per cent of said diamine component may also be replaced by other aromatic diamines. The greatest feature of said novel aromatic polyamide-imide is that it is soluble in phenolic solvents. The solution of the polyamide-imide in a phenolic solvent can be used as a varnish for forming a heat-resistant film and as a magnet wire and in other various fields.

12 Claims, 4 Drawing Figures

INVENTORS

MUNEHIKO SUZUKI
MISAO WAKI
MASATADA FUKUSHIMA

BY Craig, Antonelli, Stewart & Hill

ATTORNEYS

PHENOLIC-SOLVENT-SOLUBLE AROMATIC POLYAMIDE-IMIDE AND PROCESS FOR PRODUCING SAME

The present invention relates to a novel polyamide-imide and a process for producing the same. More particularly, it relates to an aromatic polyamide-imide which is soluble in phenolic solvents and has a good stability when stored as a varnish.

There has heretofore been known a process for producing an aromatic polyamide-imide which comprises reacting at a low temperature of up to 70° C., preferably 25° to 50° C. a trimellitic anhydride monoacid halide with an aromatic diamine in substantially equimolar amounts in an organic solvent such as N-methyl-2-pyrrolidone or N,N-dimethylacetamide to form an aromatic polyamide-acid, forming the aromatic polyamide-acid into a film and then heating the film to effect dehydration-cyclization [see Japanese Pat. Publication No. 15,637/67 U.S. application Ser., No. 252,557 filed Jan. 21, 1963)]. Since in said reaction a hydrogen halide is produced as by-product, there has been known a process in which an acid acceptor, such as triethylamine, pyridine or the like is added to the reaction system to remove the resulting hydrogen halide (see Japanese Pat. Publication No. 30,260/68).

According to such a conventional process for producing an aromatic polyamide-imide, only trimellitic anhydride monoacid halides can be used as the acid component, and in addition, expensive, organic, polar solvents must be used as the reaction medium. Therefore, the thus produced resin is very expensive. Further, the organic, polar solvents are harmful to the human body, and hence, a special care is required in handling the solvents. In addition, said reaction is effected at low temperatures, and therefore, the hydrogen halide produced as by-product is difficult to remove off and a means for removing the hydrogen halide is required after the reaction.

Moreover, the aromatic polyamide-imide synthesized by such conventional processes is insoluble in organic polar solvents, and hence, it is necessary to use a polyamide-acid prior to conversion into the polyamide-imide in the formation of a film therefrom. In this case, foaming due to water formed is caused during heating the polyamide-acid used as varnish, and hence, it is impossible to apply the polyamide-acid solution in a large amount at one time.

A process is also known in which an aromatic tetracarboxylic acid dianhydride and an aromatic diamine are reacted in substantially equimolar amounts in an organic polar solvent at a temperature as low as up to 50° C., preferably up to 20° C. to obtain an aromatic polyamide-acid and then heating this after shaping to effect dehydration-cyclization to form an aromatic polyimide. This process has also the same disadvantages as mentioned above, though no hydrogen halide is formed.

An object of the present invention is to provide a phenolic-solvent-soluble aromatic polyamide-imide.

Another object of the invention is to provide a process for producing an aromatic polyamide-imide in which the reaction can be effected at a temperature higher than 80° C., preferably higher than 100° C., but lower than the boiling point of the reaction medium.

A further object of the present invention is to provide an aromatic polyamide-imide having an improved heat-resistance.

The other objects and advantages of the present invention will be apparent from the following description.

According to the present invention, the novel aromatic polyamide-imide consists essentially of 10 to 90 mole per cent of the following unit:

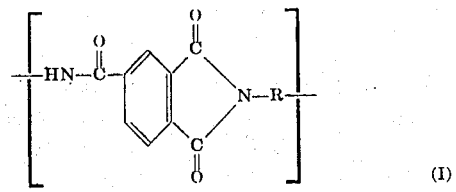

(I)

wherein R is a divalent radical having benzene unsaturation, the two bonds of which are attached to different carbon atoms of the benzene ring, at least 30 mole per cent of R being at least one member selected from the group consisting of aromatic divalent radicals represented by the formulas:

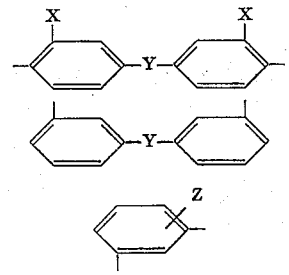

and wherein X is at least one member selected from the group consisting of lower alkyl groups, such as methyl, ethyl, n-propyl, iso-propyl, etc.; lower alkoxy, such as methoxy, ethoxy, n-propoxy, iso-propoxy, etc.; halogen atoms, such as chlorine, bromine, iodine, etc.; —COOH; —OH and —SO₃H, Y is at least one member selected from the group consisting of

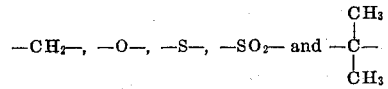

and Z is a lower alkyl group, such as methyl, ethyl, n-propyl, iso-propyl, etc., and 90 to 10 mole per cent of the following unit:

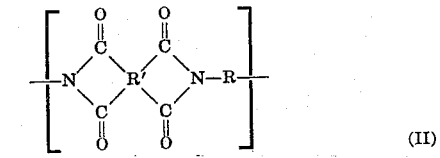

(II)

wherein R' is at least one member selected from the group consisting of tetravalent aromatic radicals represented by the formulas:

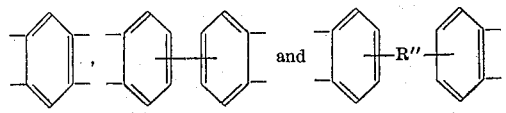

in which R'' is at least one member selected from the group consisting of

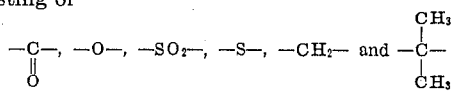

at least
one of the units represented by the formula (I) and the formula:

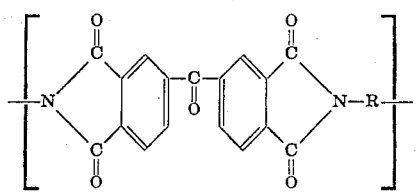

being present
in an amount of at least 30 mole per cent, said polyamide-imide having an inherent viscosity of at least 0.1 as measured in m-cresol at a concentration of 5 g. per 100 ml. of solvent at 30° C.

The term "inherent viscosity" used herein means the viscosity calculated from the following equation:

$$\text{Inherent viscosity} = \frac{\ln \frac{\text{Viscosity of solution}}{\text{Viscosity of solvent}}}{C}$$

in which C is the concentration of the polymer solution expressed in grams of polymer per 100 ml. of solvent and the viscosity of solution is the viscosity measured at 30° C. of a solution of 0.5 g. of polymer in 100 ml. of cresol.

In addition to the divalent radicals represented by the above-mentioned formulas, there are preferably used for R radicals represented by the formulas:

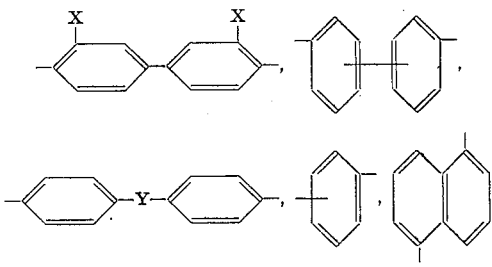

and the like.

The terminal groups of the present polyamide-imide are mainly

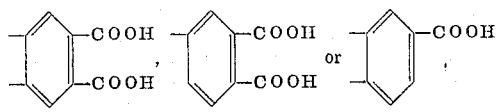

when the acid component is used in excess of the diamine. When the acid component is an acid halide or ester in this case, the terminal groups are

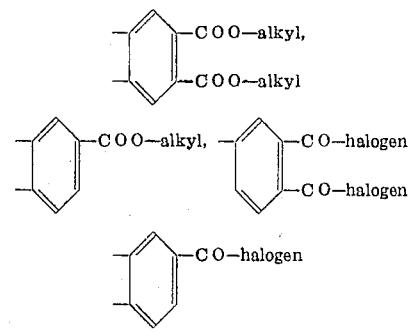

or

When the acid component is anhydride the terminal groups are

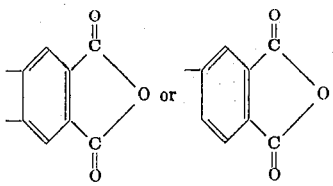

When the amine component is in excess, the terminal groups are $-NH_2$. When the acid component and the amine component are used in substantially equimolar amounts, the terminal groups are in substantially equimolar admixture of these groups.

The present polyamide-imide has in the molecular structure both amide linkage and imide linkage, and hence, it has simultaneously the properties as polyamide, i.e., flexibility and toughness when formed into a film, and the properties as polyimide, i.e., heat-resistance. Accordingly, when the amount of unit (I) is relatively large, the polymer is excellent in flexibility and toughness, and when the amount of unit (II) is relatively large, the polymer is excellent in heat-resistance.

The solubility of the polyamide-imide in phenolic solvents depends upon the amount of unit (I) and the kind of R and R'. That is, when the amount of unit (I) is relatively large, R contains radicals represented by the formulas:

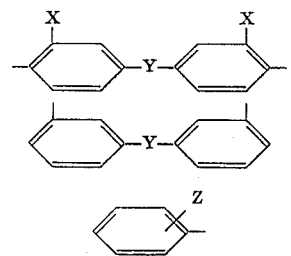

and

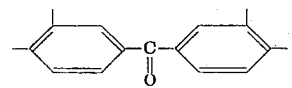

and R' contains

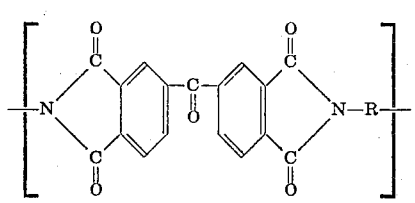

the solubility of the polyamide-imide is highest.

When the present polyamide-imide contains at least one of the units represented by the formula (I) and the formula:

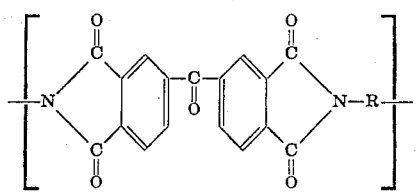

in an amount of at least 30 mole per cent, preferably at least 40 mole per cent, and also contains for R at least 30 mole per cent, based on the total amount of R, of divalent radicals represented by the formulas:

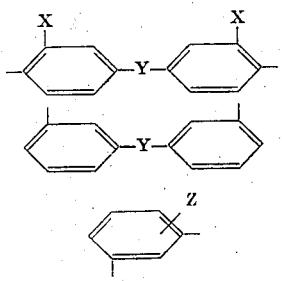

and

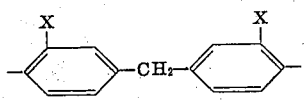

the polyamide-imide is soluble in phenolic solvents. Further, when the polyamide-imide contains

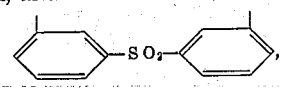

for R, the flexibility of a film obtained therefrom becomes good, and when R is

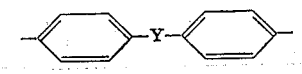, the solubility of the polyamide-imide is enhanced.

When the polyamide-imide contains a large amount of divalent radicals having bonds attached to the para-positions, the heat-resistance and mechanical properties of a film obtained therefrom are enhanced, said radicals being represented by the formulas:

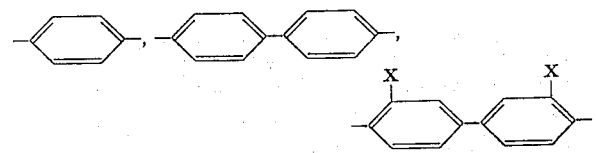

and

The present polyamide-imide is obtained in the form of a transparent solution by heating in substantially equimolar amounts (1) a mixture of 10 to 90 mole per cent of trimellitic acid, or anhydride, an acid halide or a lower alkyl ester thereof and 90 to 10 mole per cent of an aromatic tetracarboxylic acid represented by the formula:

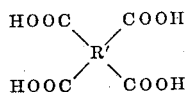

wherein R' is the same as defined above (when the amount of the trimellitic acid or its derivative is less than 30 mole per cent, 3,3',4,4'-benzophenone tetracarboxylic acid is contained in an amount such that the total amount of this benzophenone tetracarboxylic acid and trimellitic acid or its derivative becomes at least 30 mole per cent) and (2) a diamine represented by the formula:

$$H_2N-R-NH_2$$

R is the same as defined above, at least 30 mole per cent of which is at least one member selected from the group consisting of diamines represented by the formulas:

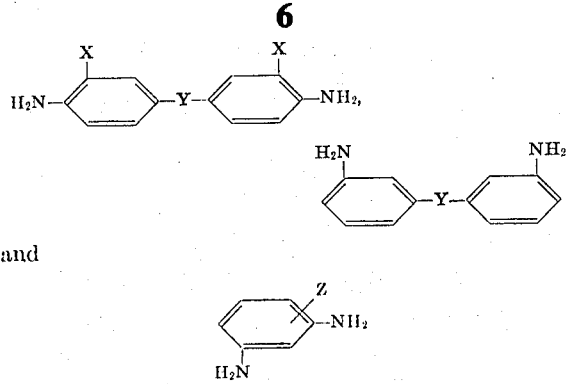

and

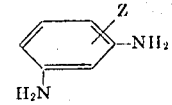

wherein X, Y and Z are the same as defined above, in a phenolic solvent at a temperature higher than 80° C., preferably higher than 100° C. but lower than the boiling point of the phenolic solvent for a period sufficient to complete imide-cyclization reaction.

As other aromatic tetracarboxylic acids than 3,3',4,4' used those represented by the formulas:

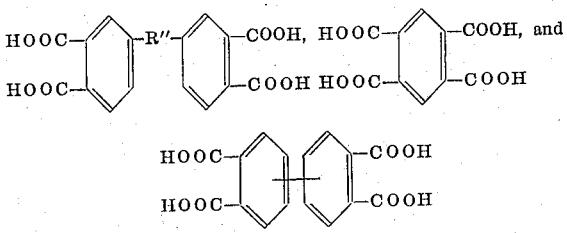

wherein R'' is the same as defined above.

As other aromatic diamines than those represented by the above-mentioned three formulas, there are used those represented by the formulas:

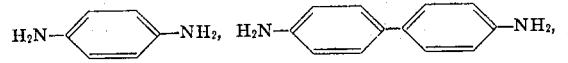

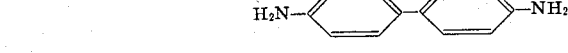

and

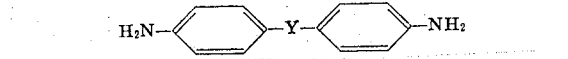

The reaction may be promoted by use of a catalyst, such as a metal naphthenate, for example, lead naphthenate; an organotitanium compound, for example, tetrabutyl titanate; γ-picoline; quinoline; a tertiary amine, for example, trimethylamine; or the like. Further, the reaction may be effected at a lower temperature under reduced pressure.

The phenolic solvents used in the present invention include not only phenol but also cresols, such as o-, m-, and p-cresols; xylenols, for example, 2,3-xylenol, 2,4-xylenol, 2,5-xylenol, 2,6-xylenol, 3,4-xylenol, 3,5-xylenol, etc. and halogen-derivatives thereof, such as mono-, di-, tri- and tetra-halocresols, mono-, di- and tri-haloxylenols, in which the halogen may be chlorine, bromine or iodine. Among the halogen-derivatives, normally liquid compounds are preferable, though even normally solid compounds may be used in the form of a solution in a small amount of an aromatic hydrocarbon, such as toluene, xylene or the like. However, since the reaction medium is usually evaporated off from the product and halogenated phenols are more expensive than unhalogenated phenols, it is desirable to use unhalogenated phenols, such as phenol, cresol or xylenol. The phenolic solvents may be used in the form of a mixture with less than 30 percent by weight of a poor solvent, such as solvent naphtha, toluene or xylene, as the reaction medium and as the diluent for the product.

In the present process, there are caused a reaction between trimellitic acid and a diamine to form amide and imide and a reaction between tetracarboxylic acid and a diamine to form imide, and these reactions proceed in two steps to effect dehydration-condensation as follows: Reaction between trimellitic acid and diamine

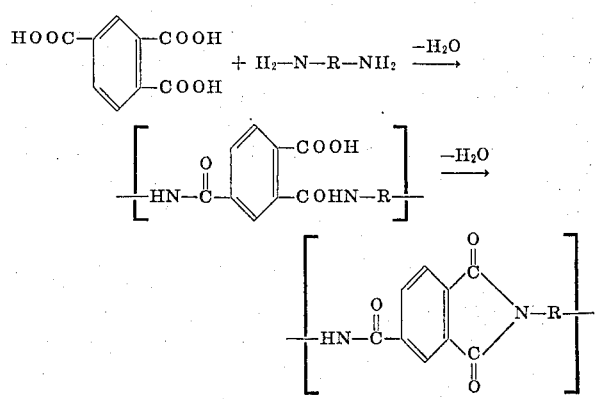

Reaction between tetracarboxylic acid and diamine

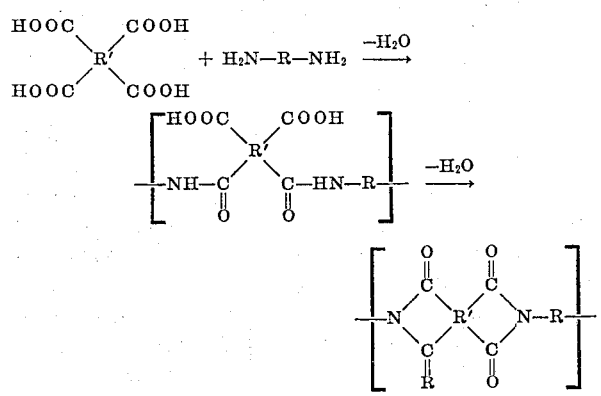

Therefore, when it is desired to introduce a specific radical in the desired amount into the polyamide-imide, it is sufficient to use the starting tetracarboxylic acid or diamine corresponding to the specific radical in the desired molar ratio. The molar proportion of the acid component to the diamine component may be 1 : 0.9 to 1.1, though it is preferably 1 : 1, in which range an aromatic polyamide-imide having a sufficiently high molecular weight can be produced.

Since the reaction is effected at a temperature as high as 80° C. or more, preferably 100° C. or more in the present process, not only monoacid halides of trimellitic anhydride or tetracarboxylic anhydride but also said acid per se and lower alkyl esters thereof, such as methyl, ethyl or propyl esters may be used as the acid component. Even when the monoacid halide is used, the hydrogen halide produced as by-product can be stripped off from the system by heating, and hence, there is required no particular step for removing the hydrogen halide. Since the reaction is effected by heating, it is easy to control the reaction temperature as compared with low temperature reaction, and the reaction proceeds rapidly. The reaction time is, for example, about one hour at 160° C.

The accompanying drawings show infra-red absorption spectrum charts, in which

Figure 2:
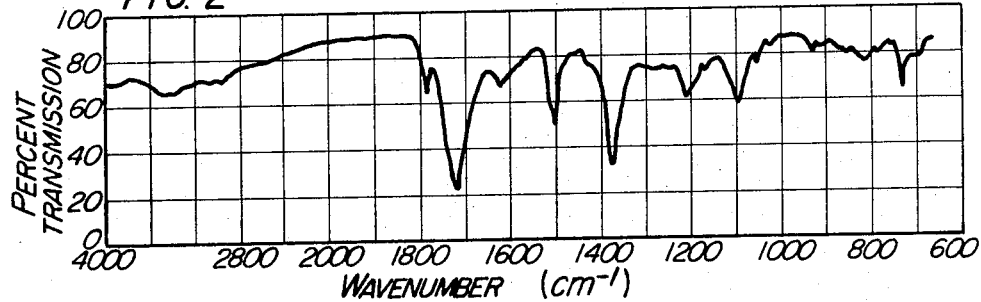
Figure 3:
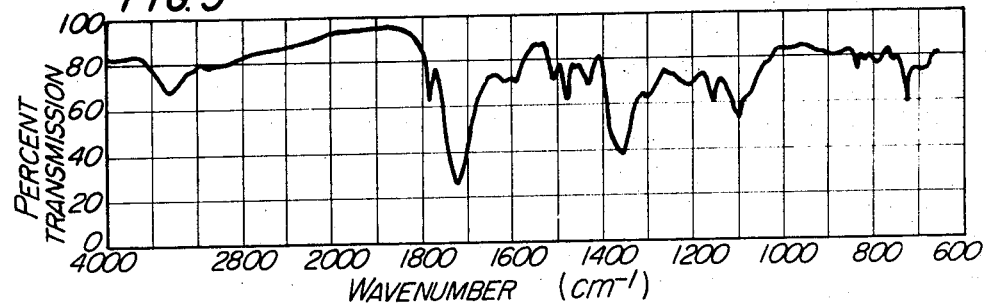
Figure 4:
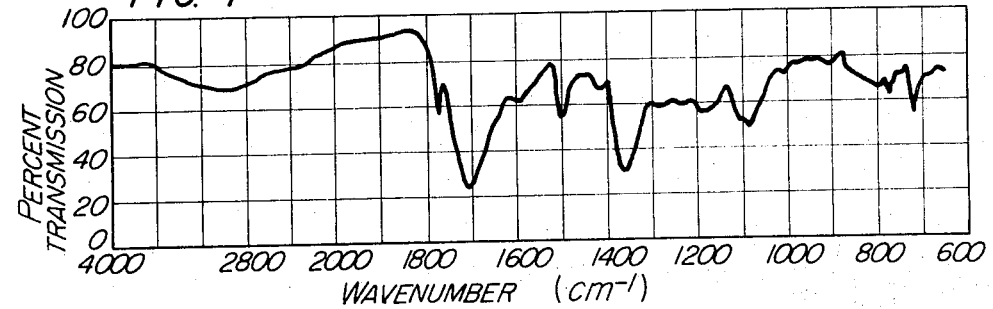

FIG. 1 is the chart of infra-red absorption spectrum of the polyamide-imide obtained in Example 1, FIG. 2 is the chart of infra-red absorption spectrum of the polyamide-imide obtained in Example 10, FIG. 3 is the infra-red absorption spectrum chart of the polyamide-imide obtained in Example 18 and FIG. 4 is that of the polyamide-imide obtained in Example 21.

The formation of a polyamide-imide is confirmed by the fact that the chart of the infra-red absorption spectrum of the reaction product indicates characteristic absorption due to imide in the neighborhood of 1780 $cm^{-1}$, 1730 $cm^{-1}$ and 730 $cm^{-1}$ and the disappearance of characteristic absorption due to free carboxyl group in the neighborhood of 1700 $cm^{-1}$. The chart of infra-red absorption spectrum of a polyamide-acid does not indicate either of the phenomena.

The present aromatic polyamide-imide as produced in the form of a resin solution may be used as a varnish, or if necessary, it may be used in the form of a mixture with a modifier. Further, the polyamide-imide can be isolated by adding a large amount of a poor solvent to the resin solution to precipitate the resin and then stored. As the modifier, there may be used soluble polyesters, diisocyanates and the like. The isolated polyamide-imide can again be dissolved in a solvent and the resulting solution can be used as a varnish. The isolated polyamide-imide as it is can be used as a stabilizing agent for rubbers and plastics or as a compression-molding resin.

The greatest feature of the present polyamide-imide is that the polyamide-imide itself can be dissolved in an inexpensive, non-toxic phenolic solvent. Conventional polyamide-imides per se are insoluble in any solvent and even polyamide-acids are soluble only in expensive, toxic, organic polar solvents, and hence, when the solution is used as a varnish, water is formed by dehydration-cyclization during heating, whereby a foam is formed in the coating and a special care is required. On the other hand, the present polyamide-imide has no such disadvantages. Therefore, the present polyamide-imide varnish can be applied in a large amount at one time, whereby the number of applications can be reduced. A varnish generally contains a solvent in an amount larger than a half of the weight of the varnish and the solvent is finally evaporated off, and hence, the use of the present polyamide-imide dissolved in an inexpensive phenolic solvent results in the reduction of the cost of varnish.

The present invention will be further explained by referring to the following Examples, which are only by way of illustration and not by way of limitation. In the Examples, the infra-red absorption spectrum charts were obtained by a KBr tablet method.

EXAMPLE 1

Into a three-necked flask equipped with a thermometer, a stirrer and a condenser were charged 19.3 g. (0.06 mole) of 3,3',4,4'-benzophenone tetracarboxylic dianhydride, 7.6 g. (0.04 mole) of trimellitic anhydride, 22.8 g. (0.1 mole) of 3,3'-dimethyl-4,4'-diaminodiphenylmethane and 140 g. of m-cresol at the same time, and the resulting mixture was heated with stirring to elevate the temperature from room temperature to 160° C., at which temperature water began to be gradually evaporated out of the reaction system and the solution came to be transparent gradually. The effusion of water vapor from the reaction system was stopped after about 1 hr., after which the reaction was terminated. Acetone was gradually added to the resulting resin solution to precipitate a pale yellow resin, which was filtered off and then dried at room temperature under vacuum, whereby 44.3 g. (yield: 96 percent by weight) of a polyamide-imide was obtained, which had an inherent viscosity of 0.76. The infra-red absorption spectrum chart thereof was as shown in FIG. 1, in which absorption appeared in the neighborhood of 1780 $cm^{-1}$, 1730 $cm^{-1}$ and 730 $cm^{-1}$ and absorption disappeared in the neighborhood of 1700 $cm^{-1}$, the former absorption being characteristic of imide and the latter absorption being characteristic of free carboxyl group. From this fact, it was confirmed that imidation was substantially completely effected. Said resin did not melt even at 350° C.

EXAMPLE 2

Into the same flask as in Example 1 were simultaneously charged 3.6 g. (0.01 mole) of 3,3',4,4'-benzophenone tetracarboxylic acid, 17.2 g. (0.09 mole) of trimellitic anhydride, 26.9 g. (0.1 mole) of 3,3'-dichloro-4,4'-diaminodiphenylmethane and 150 g. of technical grade xylenol (m-cresol, p-cresol: 27.9 percent; 2,4-xylenol, 2,5-xylenol: 33.1 percent; p-ethylphenol, 3,4-xylenol: 31.0 percent and others: 7.3 percent) (the same is hereinafter applied), and the resulting mixture was heated with stirring to elevate the temperature from room temperature to 170° C., at which temperature water began to be gradually evaporated out of the reaction system and the solution came to be transparent gradually. After about 1 hour, the effusion of water vapor from the reaction system was over, after which the reaction was terminated. Acetone was gradually added to the resulting resin solution to precipitate a pale yellow resin, which was then filtered off and thereafter dried at room temperature under vacuum, whereby 42.3 g. (yield: 97 percent by weight) of a polyamide-imide was obtained, which had an inherent viscosity of 0.87. The infra-red absorption spectrum chart of the product indicated that characteristic absorption due to imide appeared in the neighborhood of 1780 $cm^{-1}$, 1730 $cm^{-1}$ and 730 $cm^{-1}$ and characteristic absorption due to free carboxyl group disappeared in the neighborhood of 1700 $cm^{-1}$, whereby it was confirmed that the product was substantially completely imidated. The resin did not melt even at 350° C.

EXAMPLE 3

In the same manner as in Example 1, a pale yellow polyamide-imide was prepared by use of the following starting materials and solvent under the following conditions:

| | |
|---|---|
| Trimellitic acid: | 10.5 g. (0.05 mole) |
| 3,3',4,4'-diphenyl tetracarboxylic acid: | 16.5 g. (0.05 mole) |
| 3,3'-diaminodiphenyl sulfone: | 24.8 g. (0.1 mole) |
| m-Cresol: | 150 g. |
| Reaction temperature: | 160°C. |
| Reaction time: | 1 hr. |
| Yield: | 95.9% by weight |

The inherent viscosity of the polyamide-imide was 0.75.

EXAMPLE 4

Into the same flask as in Example 1 were charged 16.1 g. (0.05 mole) of 3,3',4,4'-benzophenone tetracarboxylic anhydride, 18.8 g. (0.05 mole) of trimellitic anhydride monoacid chloride, 23.0 g. (0.1 mole) of 3,3'-dihydroxy-4,4'-diaminodiphenylmethane and 150 g. of technical grade xylenol at the same time, and the resulting mixture was heated with stirring to elevate the temperature from room temperature to 150° C., at which temperature water and hydrogen chloride began to be gradually evaporated out of the reaction system and the solution came to be transparent gradually. After about one hour, the effusion of water vapor from the reaction system was over, after which the reaction was terminated. The effluent water changed litmus paper from blue to red. Further, when an aqueous silver nitrate solution was added to the effluent water, a white precipitate of silver chloride was formed. From these facts, it was confirmed that hydrogen chloride was evaporated out of the reaction system.

Acetone was gradually added to the resulting resin solution to precipitate a pale yellow polyamide-imide, which was filtered off and then dried under vacuum, whereby 44.2 g. (yield: 95 percent by weight) of a polyamide-imide was obtained, which had an inherent viscosity of 0.82. The infra-red absorption spectrum chart of the polymer indicated characteristic absorption due to imide in the neighborhood of 1780 $cm^{-1}$, 1730 $cm^{-1}$ and 730 $cm^{-1}$ and the disappearance of characteristic absorption due to free carboxyl group in the neighborhood of 1700 $cm^{-1}$, whereby it was confirmed that imidation was substantially completed. The thus produced resin did not melt even at 350° C.

EXAMPLES 5 to 9

In the same manner as in Example 1, polyamide-imides were prepared from the starting materials shown in Table 1 under the conditions shown in the same table. The characteristics of the thus obtained resins were as shown in Table 1.

TABLE 1

| Example No. | 5 | 6* | 7 | 8 | 9 |
|---|---|---|---|---|---|
| 3,3',4,4'-Benzophenone tetracarboxylic acid (mole) | 0.04 | | | | |
| 3,3',4,4'-Benzophenone tetracarboxylic dianhydride (mole) | | | | | 0.02 |
| Bis(3,4-dicarboxyphenyl) sulfone (mole) | | 0.03 | | | |
| Bis(3,4-dicarboxyphenyl) ether (mole) | | | 0.07 | | |
| 2,2',3,3'-Diphenyl-tetracarboxylic acid (mole) | | | | 0.03 | |

Table 1—Continued

| | 1 | 2 | 3 | 4 | 5 |
|---|---|---|---|---|---|
| Trimellitic acid (mole) | 0.06 | | | 0.07 | |
| Trimellitic anhydride (mole) | | | 0.03 | | 0.08 |
| Trimellitic anhydride monoacid chloride (mole) | | 0.07 | | | |
| 3,3'-Dicarboxy-4,4'-diaminodiphenylmethane (mole) | | 0.1 | | | |
| 3,3'-Diethoxy-4,4'-diaminodiphenyl sulfide (mole) | 0.1 | | 0.03 | | 0.02 |
| 3,3'-Disulfo-4,4'-diaminodiphenylmethane (mole) | | | 0.1 | | 0.05 |
| 3,3'-Dimethyl-4,4'-diaminodiphenylmethane | | | | 0.07 | 0.03 |
| Technical grade xylenol (g.) | 150 | 130 | 130 | 150 | 150 |
| Xylene (g.) | | 15 | | | |
| Toluene (g.) | | | 15 | | |
| Reaction conditions (Temp. × time) | 160°C × 1 hr | 180°C × 1 hr | 140°C × 4 hrs | 170°C × 1 hr | 160°C × 2 hrs |
| Yield (% by weight) | 97.0 | 98.4 | 91.2 | 95.0 | 96.2 |
| Color | Pale yellow | Do. | Do. | Do. | Do. |
| Inherent viscosity | 0.85 | 0.95 | 0.70 | 1.05 | 0.90 |
| Catalyst (% based on resin) | Tetrabutyl titanate 0.05 | — | Quinoline 0.1 | — | — |

Note: *In Example 6, the aromatic diamine used had carboxyl group in the side chain, and hence, in the infra-red absorption spectrum chart, absorption due to the carboxyl group in the side chain appeared in the neighborhood of 1700 cm$^{-1}$ even when complete imidation was effected. That said absorption was not due to polyamide-acid was confirmed by comparing the infra-red absorption spectrum chart of the resin obtained in Example 6 with that of a polyamide-acid obtained by reacting the same reactants in the same proportion as in Example 6 at a reaction temperature of 0° to 10° C. for about 2 hrs. That is, in the latter chart, substantially no characteristic absorption due to imide appeared in the neighborhood of 1780, 1730 and 730 cm$^{-1}$ and characteristic absorption due to free carboxyl group was much stronger than in the former chart.

EXAMPLE 10

Into the same flask as in Example 1 were charged 96.6 g. (0.3 mole) of 3,3',4,4'-benzophenone tetra-carboxylic dianhydride, 114.6 g. (0.6 mole) of trimellitic anhydride, 188.3 g. (0.7 mole) of 3,3'-dichloro-4,4'-diaminodiphenylmethane, 59.4 g. (0.3 mole) of 4,4'-diaminodiphenylmethane and 1,500 g. of technical grade xylenol at the same time, and the resulting mixture was heated with stirring to elevate the temperature from room temperature to 170° C., at which temperature water began to be gradually evaporated out of the reaction system and the solution came to be transparent. After about 2 hrs., the effusion of water vapor from the reaction system was over, after which the reaction was terminated. A small amount of petroleum naphtha was added to the resulting resin solution to adjust the resin content to 20 percent by weight. The resulting solution was applied to an annealed copper wire having a diameter of 1.0 mm. in a conventional manner and then baked thereon. The characteristics of the thus obtained enameled wire were as follows, that is, very excellent (baking temperature: 400° C., drawing rate: 8 m./min., film thickness: 0.047 mm.):

| | |
|---|---|
| Number of pin holes per 5 meters: | 0 |
| Flexibility (Passed smallest diameter): | Same diameter |
| Abration, repeating scrape (load 700 g.): | 211 cycles |
| Cut-through temperature (crossed on one point, load 700 g.): | >300°C. |
| Heat-shock (200°C. × 2 hrs.): | Same dia. good |
| Break down voltage (KV) | |
| Normal: | 16.5 |
| After immersion in water for 24 hrs.: | 16.2 |
| After heating at 200°C. for 2 hrs.: | 16.2 |
| Resistance to Flon 22: | Good |

These tests were made according to the following methods:

Abrasion, repeating scape

A bead pin having a diameter of 0.4 mm. was moved forward and back under a load of 700 g. at a temperature of 10° to 30° C. on the coating of a magnet wire in the direction of the length to determine the repeating scrape cycles until the conductor exposed.

Cut-through temperature

Two magnet wires were crossed and a load of 700 g. was applied to the crossing point. In this state, the crossed wires were placed in a constant temperature bath, and the temperature of the bath was elevated at a rate of 5° C./min. while allowing an alternating current of 100 V. to flow through the two wires to determine the temperature at which a short circuit was made between the two wires.

Heat-shock

Magnet wires were wound around round sticks having diameters integer times the diameter of the wire and maintained at a given temperature for a given time, after which the temperature was lowered to 10°–30° C. to determine the smallest diameter of the stick at which no crack through which the conductor was observed with the naked eye was formed in the coating.

Resistance to Flon 22

A magnet wire was fold and heated at 120° C. for 1 hour, after which the thus treated wire was immersed for 24 hrs. in Flon 22 (CHClF$_2$) at a pressure of 80 kg./cm$^2$ at 120° C. and then taken out. When the wire had no expansion like bubble or foam in the coating, it was estimated good.

A resin was obtained from the resin varnish in the same manner as in Example 1 and subjected to measurement of characteristics to find that the inherent viscosity of the resin was 0.84 and the melting point thereof was above 350° C. and the resin was pale yellow. The chart of the infra-red absorption spectrum of the resin was as shown in FIG. 2 of the accompanying drawings.

EXAMPLE 11

Into the same flask as in Example 1 were simultaneously charged 161.0 g. (0.5 mole) of 3,3',4,4'-benzophenone tetracarboxylic dianhydride, 95.5 g. (0.5 mole) of trimellitic anhydride, 59.5 g. (0.5 mole) of a 2,4-diaminotoluene/2,6-diaminotoluene (80/20) mixture, 100 g. (0.5 mole) of 4,4'-diaminodiphenyl ether and 1,500 g. of m-cresol, and the resulting mixture was heated to elevate the temperature from room temperature to 190° C., at which temperature water began to be gradually evaporated out of the reaction system and the solution came to be transparent. After about 1 hour, the effusion of water vapor from the reaction system was stopped, after which the reaction was terminated. A small amount of petroleum naphtha was added to the thus obtained resin solution to adjust the resin content to 20 percent by weight, and the resulting solution was applied to an annealed copper wire having a diameter of 1.0 mm. and baked thereon in a conventional manner. The thus obtained enameled wire had the following characteristics (baking temperature: 400°C., drawing rate: 8 m./min. and film thickness: 0.047 mm.):

| | |
|---|---|
| Number of pin holes per 5 meters: | 0 |
| Flexibility (passed smallest diameter): | Same diameter |
| Abrasion, repeating scrape (load 700 g.): | 204 cycles |
| Cut-through temperature (crossed on one point, load 700 g.): | >300°C. |
| Heat-shock (200°C. × 2 hrs.): | Same dia. good |
| Break down voltage (KV) | |
| Normal: | 16.7 |
| After immersion in water for 24 hrs.: | 16.4 |
| After heating at 200°C. for 2 hrs.: | 16.5 |
| Resistance to Flon 22: | Good |

A resin was obtained from the resin varnish in the same manner as in Example 1 and subjected to measurement of characteristics to obtain the following results: Inherent viscosity, 0.96; melting point, above 350° C.; and color, pale yellow. The infra-red absorption spectrum chart indicated clearly the characteristic absorption due to imide.

EXAMPLES 12 to 17

In the same manner as in Example 10, polyamide-imides were prepared by use of the reactants shown in Table 2 and the conditions set forth in the same table. Each of the resulting resin solutions was adjusted to a resin content of 20 percent by weight, and the resulting solution was applied to an annealed copper wire having a diameter of 1.0 mm., and then baked in a conventional manner. The characteristics of the resin and the insulating wire were as shown in Table 3 (baking temperature: 400° C., drawing rate: 8 m./min., film thickness: 0.047 – 0.048 mm.). A resin was obtained from each resin solution and subjected to measurement of inherent viscosity, melting point and color and to infra-red analysis. As a result, the resin was pale yellow and had a melting point of more than 350° C. Further, the infra-red absorption spectrum chart indicated that the resin was substantially completely imidated.

TABLE 2

| Example No. | 12 | 13 | 14 | 15 | 16 | 17 |
|---|---|---|---|---|---|---|
| 3,3',4,4'-Benzophenone tetracarboxylic dianhydride (mole) | 0.6 | | | | | 0.5 |
| Dimethyl ester of 3,3',4,4'-benzophenone tetracarboxylic acid (mole) | 0.1 | 0.9 | | | | |
| Bis(3,4-dicarboxyphenyl)propane (mole) | | | | | | 0.3 |
| Bis(3,4-dicarboxyphenyl)sulfide (mole) | | | | 0.3 | | |
| Bis(3,4-dicarboxyphenyl)methane (mole) | | | | | 0.4 | |
| Trimellitic anhydride | 0.4 | | | 0.7 | 0.6 | 0.2 |
| Methyl trimellitate | 0.9 | 0.1 | | | | |
| 3,3'-Dimethyl-4,4'-diaminodiphenylmethane (mole) | 0.7 | | | | 0.5 | |
| 3,3'-Dimethoxy-4,4'-diaminodiphenyl ether (mole) | 0.3 | | | | | 0.5 |
| 3,3'-Dicarboxy-4,4'-diaminodiphenyl sulfide (mole) | | | 0.4 | | | |
| 3,3'-Dihydroxy-4,4'-diaminodiphenylpropane (mole) | | | 0.1 | | | |
| 3,3'-Diaminodiphenyl sulfone (mole) | | | | 0.3 | | |
| 3,3'-Diaminodiphenylpropane (mole) | | | | | 0.1 | |
| 3,3'-Diaminodiphenylmethane | | | | 0.6 | | 0.3 |
| 4,4'-Diaminodiphenylmethane (mole) | 0.3 | | | | 0.2 | |
| 4,4'-Diaminodiphenyl ether (mole) | | | 0.5 | | 0.2 | |
| Benzidine (mole) | 0.7 | | | | | |
| 1,5-Diaminonaphthalene (mole) | | | | 0.1 | | 0.1 |
| Xylenol (technical grade) (g.) | 1500 | 1500 | 1500 | 1500 | 800 | 1500 |
| Phenol (g.) | | | | | 700 | |
| Reaction conditions (Temp. × time) | 170°C. × 2 hrs. | 160°C. × 2 hrs. | 190°C. × 2 hrs. | 160°C. × 2 hrs. | 160°C. × 2 hrs. | 170°C. × 3 hrs. |
| Catalyst (% based on resin) | – | Lead naphthenate 0.1 | Do. 0.1 | Do. 0.1 | Do. 0.1 | Do. 0.1 |

TABLE 3

| Example No. | 12 | 13 | 14 | 15 | 16 | 17 |
|---|---|---|---|---|---|---|
| Yield (percent by weight) | 96.5 | 94.6 | 95.1 | 96.4 | 95.3 | 98.1 |
| Inherent viscosity | 1.10 | 0.74 | 1.00 | 0.90 | 0.76 | 1.15 |
| Characteristics of enameled wire: | | | | | | |
| Number of pin holes per 5 meters | 0 | 0 | 0 | 0 | 0 | 0 |
| Flexibility | Good | Good | Good | Good | Good | Good |
| Abrasion repeating scrape (cycles) | 208 | 214 | 205 | 180 | 197 | 195 |
| Cut-through temp. (° C.) | >300 | >300 | >300 | >300 | >300 | >300 |
| Heat-shock | (1) | (1) | (1) | (1) | (1) | (1) |
| Break down voltage (kv.): | | | | | | |
| Normal | 16.5 | 16.4 | 16.5 | 16.0 | 16.9 | 15.4 |
| After immersion in water for 24 hrs | 16.4 | 16.2 | 16.1 | 15.0 | 16.7 | 15.3 |
| After heating at 200° C. for 24 hrs | 16.4 | 16.3 | 16.0 | 15.5 | 16.5 | 15.4 |
| Resistance to Flon 22 | Good | Good | Good | Good | Good | Good |

1 Same dia. good.

EXAMPLES 18 to 23

In the same manner as in Example 10, polyamide-imide solutions were prepared by use of the starting materials and conditions set forth in Table 4. Each of the resin solutions was adjusted to a resin content of 20 percent by weight, and the resulting solution was applied to an annealed copper wire having a diameter of 1.0 mm. and then baked by a conventional method. The characteristics of the thus obtained enameled wires were as shown in Table 5 (baking temperature: 400° C., drawing rate: 8 m./min., film thickness: 0.047–0.048 mm.).

EXAMPLES 24 to 29

In the same manner as in Example 10, polyamide-imide solutions were prepared by use of the starting materials and reaction conditions shown in Table 6. Each of the resin solutions was used to obtain an insulating wire in the same manner as in Example 10. The resins and the insulating wires obtained had characteristics as shown in Table 7.

Since the characteristic absorption due to free carboxyl group disappeared in the neighborhood of 1700 cm$^{-1}$, it was confirmed that all the resins obtained were substantially completely imidated. Further, the resins did not melt even at 350° C.

TABLE 4

| Example No. | 18 | 19 | 20 | 21 | 22 | 23 |
|---|---|---|---|---|---|---|
| 3,3',4,4'-benzophenone tetracarboxylic dianhydride (mole) | 0.3 | 0.03 | 0.2 | 0.3 | 0.48 | 0.8 |
| Trimellitic anhydride (mole) | 0.3 | 0.27 | 0.3 | 0.1 | 0.32 | 0.1 |
| Pyromellitic dianhydride (mole) | 0.4 | 0.7 | 0.5 | 0.6 | 0.2 | 0.1 |
| 3,3'-dicarboxy-4,4'-diaminodiphenylmethane (mole) | | | | 0.4 | | |
| 3,3'-diaminodiphenyl sulfide (mole) | | | 0.5 | | | |
| 3,3'-diaminodiphenyl ether (mole) | | 0.9 | | | | 0.8 |
| 2,4-diaminotoluene (mole) | 0.6 | | | | | |
| 1-isopropyl-2,4-m-phenylenediamine (mole) | | | | | 0.3 | |
| p-Phenylenediamine (mole) | | 0.1 | | | | 0.1 |
| 4,4'-diaminodiphenyl sulfide (mole) | 0.4 | | | | | |
| 3,3'-dimethoxybenzidine (mole) | | 0.1 | | | 0.7 | |
| 4,4'-diaminodiphenylpropane (mole) | | | 0.5 | | | |
| 4,4'-diaminodiphenylmethane (mole) | | | | 0.6 | | 0.1 |
| Xylenol (technical grade) (g.) | 1,500 | 1,500 | 1,500 | 1,500 | 1,500 | 1,500 |
| Reaction condition (temp.×time) | 180° C.×2 hrs. | 180° C.×2 hrs. | 170° C.×2 hrs. | 170° C.×1 hr. | 170° C.×2 hrs. | 170° C.×2 hrs. |
| Catalyst (percent based on resin) | | | Tetrabutyl titanate 0.1. | Lead naphthenate 0.05. | Lead naphthenate 0.05. | γ-Picoline 0.1. |

TABLE 5

| Example No. | 18 | 19 | 20 | 21 | 22 | 23 |
|---|---|---|---|---|---|---|
| Yield (percent by weight) | 95.4 | 94.8 | 97.6 | 98.1 | 97.5 | 96.9 |
| Inherent viscosity | 0.72 | 0.70 | 1.11 | 0.98 | 0.88 | 0.79 |
| Infra-red analysis chart | (1) | | (2) | | | |
| Characteristics of enameled wire: | | | | | | |
| Number of pin holes per 5 meters | 0 | 0 | 0 | 0 | 0 | 0 |
| Flexibility | Good | Good | Good | Good | Good | Good |
| Abrasion repeating scrape (cycles) | 124 | 89 | 112 | 92 | 201 | 265 |
| Cut-through temp. (° C.) | >300 | >300 | >300 | >300 | >300 | >300 |
| Heat-shock | (3) | (3) | (3) | (3) | (3) | (3) |
| Break down voltage (kv.): | | | | | | |
| Normal | 16.8 | 16.5 | 16.4 | 16.7 | 16.5 | 16.2 |
| After immersion in water for 24 hrs | 16.6 | 16.2 | 16.1 | 16.5 | 16.3 | 16.0 |
| After heating at 200° C. for 2 hrs | 16.7 | 16.3 | 16.2 | 16.5 | 16.2 | 15.9 |
| Resistance to Flon 22 | Good | Good | Good | Good | Good | Good |

1 Figure 3.  2 Figure 4.  3 Same dia. good.

TABLE 6

| Example No. | 24 | 25 | 26 | 27 | 28 | 29 |
|---|---|---|---|---|---|---|
| Trimellitic anhydride monoacid chloride (mole) | 0.7 | 0.5 | 0.5 | 0.7 | 0.8 | 0.45 |
| Pyromellitic dianhydride (mole) | 0.3 | | 0.5 | | 0.2 | 0.55 |
| 3,3',4,4'-diphenyl tetracarboxylic dianhydride (mole) | | 0.2 | | | | |
| 2,3,6,7-naphthalene tetracarboxylic dianhydride (mole) | | | | 0.1 | | |
| 2,2-bis(3,4-dicarboxyphenyl)propane (mole) | | 0.3 | | | | |
| Bis(3,4-dicarboxyphenyl)ether (mole) | | | | 0.2 | | |
| 3,3'-dimethyl-4,4'-diaminodiphenylmethane (mole) | 0.3 | | | | 0.8 | |
| 3,3'-dichloro-4,4'-diaminodiphenylmethane (mole) | | | 0.4 | | | 0.2 |
| 3,3'-diaminodiphenyl ether (mole) | | | 0.4 | | | |
| 3,3'-diaminophenyl sulfide (mole) | | 0.6 | | | | |
| 2,4-diaminotoluene/2,6-diaminotoluene=80/20 (mole) | 0.1 | | | 0.1 | | 0.4 |
| 4,4'-diaminodiphenyl sulfone (mole) | | 0.4 | | 0.3 | | |
| 4,4'-diaminodiphenylmethane (mole) | | | 0.6 | | | 0.1 |
| 4,4'-diaminodiphenyl ether (mole) | 0.6 | | | 0.2 | 0.2 | 0.3 |
| Xylenol (technical grade) (g.) | 1,500 | 1,500 | 1,500 | 1,500 | 1,500 | 1,500 |
| Reaction conditions (temp.×time) | 160° C.×2 hrs. | 170° C.×2 hrs. | 160° C.×1 hr. | 170° C.×2 hrs. | 180° C.×4 hrs. | 170° C.×2 hrs. |

TABLE 7

| Example No. | 24 | 25 | 26 | 27 | 28 | 29 |
|---|---|---|---|---|---|---|
| Yield (percent by weight) | 94.1 | 97.0 | 95.4 | 96.2 | 98.0 | 97.5 |
| Inherent viscosity | 0.47 | 0.51 | 0.96 | 0.60 | 1.20 | 0.35 |
| Characteristics of enameled wire: | | | | | | |
| Number of pin holes per 5 meters | 0 | 0 | 0 | 0 | 0 | 0 |
| Flexibility | Good | Good | Good | Good | Good | Good |
| Abrasion repeating scrape (cycles) | 200 | 150 | 120 | 205 | 145 | 193 |

From each of the resin solutions was obtained a resin, which was subjected to infra-red analysis and measurement of melting point and color to find that the melting point was above 350° C. and the color was pale yellow. Further, the infra-red absorption spectrum chart indicated that the resin was substantially completely imidated.

What we claim is:

1. An aromatic polyamide-imide soluble in phenolic solvents which has an inherent viscosity of at least 0.1 as measured in m-cresol at 30° C. at a concentration of 0.5 g./100 ml. and which consists essentially of 10 to 90 mole percent of the unit represented by the formula:

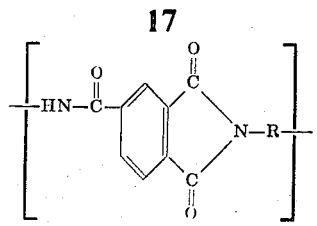

(I)

wherein R is a divalent radical having benzene unsaturation, the two bond of which are attached to different carbon atoms of the benzene ring, at least 30 mole percent of R being at least one member selected from the group consisting of aromatic divalent radicals represented by the formulas:

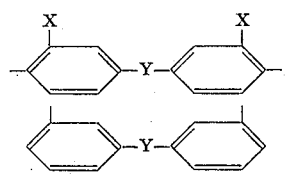

and

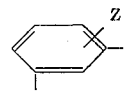

and the remaining R being at least one member selected from the group consisting of aromatic divalent radicals represented by the formulas:

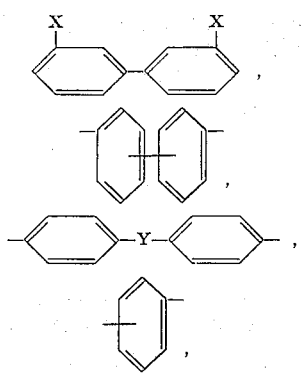

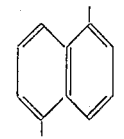

and

wherein X is at least one member selected from the group consisting of lower alkyl groups, lower alkoxy groups, halogen atoms, —COOH, —OH and —SO$_3$H; Y is at least one member selected from the group consisting of —CH$_2$—, —O—, -S-, -SO$_2$- and $$-\underset{\underset{CH_3}{|}}{\overset{\overset{CH_3}{|}}{C}}-$$

and Z is a lower alkyl group, and 90 to 10 mole percent of the unit represented by the formula:

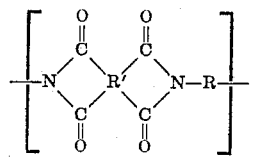

(II)

wherein R' is at least one member selected from the group consisting of tetravalent aromatic radicals represented by the formulas:

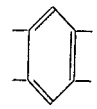

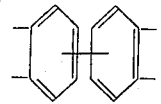

and

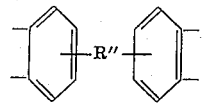

in which R" is at least one member selected from the group consisting of

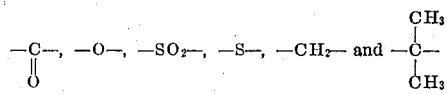

at least one of the units represented by the formula (I) and the formula:

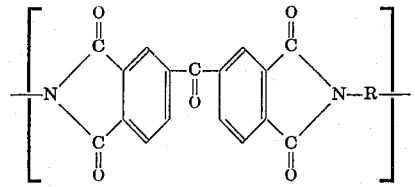

(III)

in which R is the same as defined above, being present in an amount of at least 30 mole percent.

2. An aromatic polyamide-imide according to claim 1, wherein at least one of the units represented by the formulas (I) and (III) is present in an amount of at least 40 mole per cent.

3. An aromatic polyamide-imide according to claim 1, wherein R' is at least one member selected from the group consisting of tetravalent aromatic radicals represented by the formulas:

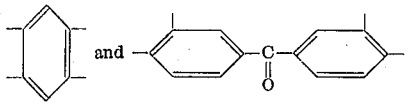

4. An aromatic polyamide-imide according to claim 1, wherein 100 mole percent of R is at least one member selected from the group consisting of divalent aromatic radicals represented by the formulas:

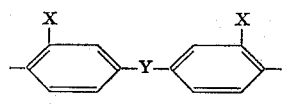

and

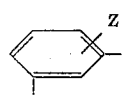

in which X, Y and Z are the same as defined above.

5. An aromatic polyamide-imide according to claim 3, wherein 100 mole percent of R is at least one member selected from the group consisting of divalent radicals represented by the formulas:

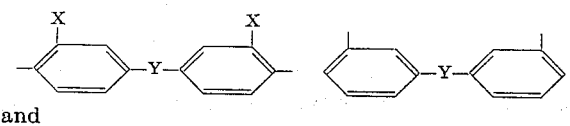

and

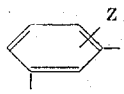

wherein X, Y and Z are the same as defined above.

6. A process for producing an aromatic polyamide-imide defined in claim 1, which comprises heating in the presence of a phenolic solvent (a) 10 to 90 mole percent of a mixture of at least one member selected from the group consisting of trimellitic acid, trimellitic anhydride, trimellitic anhydride monoacid halides and lower alkyl esters of trimellitic acid and at least one member selected from the group consisting of tetracarboxylic acid represented by the formula:

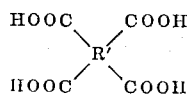

wherein R' is the same as defined above, and its anhydride and lower alkyl esters, said mixture containing at least 30 mole percent of at least one member selected from the group consisting of trimellitic acid, trimellitic anhydride, trimellitic anhydride monoacid halides, lower alkyl esters of trimellitic acid, 3,3′,4,4′-benzophenone tetracarboxylic acid and its anhydride and lower alkyl esters, and (b) a diamine represented by the formula:

$$H_2N-R-NH_2$$

wherein R is the same as defined above, at least 30 mole percent of said diamine being at least one member selected from the group consisting of diamines represented by the formulas:

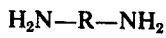

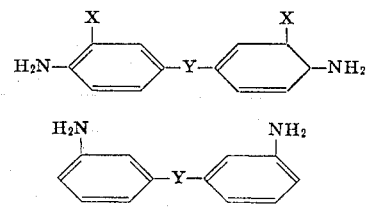

and

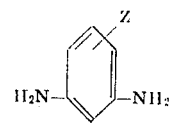

and the remaining mole percent of said diamine being at least one member selected from the group consisting of diamines represented by the formulas:

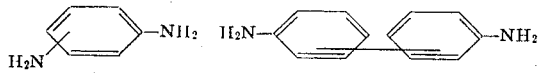

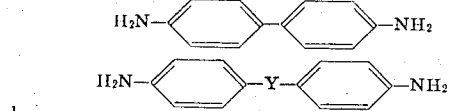

and

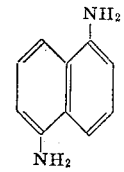

wherein X, Y and Z are the same as defined above, said (a) and (b) components being in a molar ratio of 1 : 0.9 to 1.1, at a temperature higher than 80° C. but lower than the boiling point of said phenolic solvent for a period of time sufficient to substantially complete the imide-cyclization reaction.

7. A process according to claim 6, wherein the (a) component contains at least 40 mole per cent of at least one member selected from the group consisting of trimellitic acid, trimellitic anhydride, trimellitic anhydride monoacid halides, lower alkyl esters of trimellitic acid, and 3,3′,4,4′-benzophenone tetracarboxylic acid and anhydride and lower alkyl esters thereof.

8. A process according to claim 6, wherein the reaction temperature is higher than 100° C.

9. A process according to claim 6, wherein the phenolic solvent contains 30 percent by weight of a poor solvent selected from the group consisting of solvent naphtha, toluene and xylene.

10. A process according to claim 6, wherein the phenolic solvent is at least one member selected from the group consisting of phenol, cresols and xylenols.

11. A process according to claim 6, wherein the reaction is effected in the presence of a catalyst.

12. A process according to claim 11, wherein the catalyst is a metal naphthenate, tetrabutyl titanate, γ-picoline, quinoline or a tertiary butyl amine.

* * * * *